(12) United States Patent
Dorsch

(10) Patent No.: US 6,948,814 B2
(45) Date of Patent: Sep. 27, 2005

(54) OPTICAL LENS OR GLASS HAVING A LABEL AND/OR MARKING ON THE FRONT SURFACE AND/OR REAR SURFACE

(75) Inventor: Rainer Dorsch, Munich (DE)

(73) Assignee: Rodenstock GmbH, Munich (DE)

( * ) Notice: Subject to any disclaimer, the term of this patent is extended or adjusted under 35 U.S.C. 154(b) by 0 days.

(21) Appl. No.: 10/783,040

(22) Filed: Feb. 23, 2004

(65) Prior Publication Data

US 2004/0189931 A1 Sep. 30, 2004

Related U.S. Application Data

(63) Continuation of application No. PCT/DE02/03099, filed on Aug. 20, 2002.

(30) Foreign Application Priority Data

Aug. 21, 2001 (DE) .......................................... 101 39 971

(51) Int. Cl.⁷ ........................... G02C 7/02; B29D 11/00
(52) U.S. Cl. ........................ 351/159; 264/2.7; 351/177
(58) Field of Search ....................... 264/2.7; 351/160 R, 351/160 H, 161, 162, 159, 177

(56) References Cited

U.S. PATENT DOCUMENTS 5,123,722 A * 6/1992 Meymand .................... 359/592
5,467,149 A * 11/1995 Morrison et al. ........... 351/162
5,936,704 A 8/1999 Gabrielian et al.

FOREIGN PATENT DOCUMENTS

| DE | 296 11 130 U1 | 6/1998 |
| EP | 0 031 633 A2 | 4/1980 |
| EP | 0 103 217 A2 | 8/1983 |
| EP | 0 307 874 A2 | 9/1988 |
| EP | 0 952 476 A1 | 10/1999 |
| EP | 1 158 339 A1 | 11/2001 |
| FR | 2 513 771 | 9/1981 |
| WO | WO 98/33088 | 7/1998 |
| WO | WO 01/24994 A1 | 4/2001 |

OTHER PUBLICATIONS

English translation of the International Preliminary Examination Report.

* cited by examiner

Primary Examiner—Scott J. Sugarman
(74) Attorney, Agent, or Firm—Crowell & Moring LLP

(57) ABSTRACT

The invention relates to an optical lens or glass with an identification and/or marking on the front and/or rear surface. The inventive lens or glass with an identification and/or marking on the front and/or back surface is characterized by an identification and/or marking which consists of a plurality of elements, each element causing a spectral dispersion of the incident light and reflected light.

14 Claims, 1 Drawing Sheet

OPTICAL LENS OR GLASS HAVING A LABEL AND/OR MARKING ON THE FRONT SURFACE AND/OR REAR SURFACE

CROSS-REFERENCE TO RELATED APPLICATIONS

This application is a CONTINUATION of PCT Application No. PCT/DE02/03099, filed on 20 Aug. 2002.

BACKGROUND OF THE INVENTION

The present invention relates to an optical lens or glass having a label and/or marking on the front surface and/or rear surface, which is directly visible under all lighting conditions.

Optical glasses, such as spectacle lens or watch glasses, mostly have a label that indicates the glass manufacturer. This feature is very important, because it is to be possible to recognize from viewing the glasses that a brand product or an authentic product is involved, or the glass manufacturer is to be immediately visible.

It may be gathered from this that such labels must be applied to the above-named glasses in a permanent form without changing the optical properties of the glass.

Various methods are known for applying labels. A distinction is made in principle between methods in which dyes and, in particular fluorescent dyes are applied to the surface or introduced into the surface, and methods in which engravings or the like are introduced into the surface, that is to say the optical surface is provided with a small impression etc.

In the case of methods in which engravings are introduced into the surface, a distinction is made between contact and non-contact methods. Whereas the contact methods are generally executed with the aid of fine mechanical methods, as in the case of the use of stylus, non-contact methods use the interaction of light with the surface to be labeled, or of a layer—the layer causing interaction or reinforcing it—which is applied (temporarily) to the surface and has a particularly effective interaction with the irradiated light.

In both cases, these are expensive methods which require a careful handling of the glass surface and/or a complex apparatus.

So-called breath marks are known, i.e., various substances which have a different wetability with the glass surface being applied in the form of the label and/or marking by way of a die for the purpose of labeling and/or marking the optical glass. Such labels and/or markings have the disadvantage that they can hold only for a short time, and also the entire method is very complicated.

A method that is likewise known produces labels and/or markings on the glass surface with the aid of masks or stencils that have an aperture in the shape of the label and/or marking. The suitable substance is vapor deposited through the aperture so as to produce the label and/or marking on the glass surface. However, the glass treated with the aid of such a method exhibits a label that is not properly sharp at the edge because of the distance—albeit only a small one—between the lens and stencil.

EP-B1-0 103 217 further discloses a spectacle lens having a reflection-reducing layer, the label and/or marking being incorporated in the form of at least one region cut out from the reflection-reducing layer. Applied in the region to be cut out for the label and/or marking is a substance that is bonded in a fashion such that it can be wiped away and which is wiped away at a later point in time together with the reflection-reducing layer vapor-deposited on it.

The disadvantages of this method are the restrictive application only for lenses, the reflection-reducing layers occur and, in addition, the fact that the application of the substance that is bonded in a fashion such that it can be wiped away is expensive because the large number of items.

A similar lens is also described in EP-B1-0 307 874, mask inscription by way of an excimer laser being used in order to produce the label and/or marking. An excimer laser is used to irradiate a mask that incorporates the shape of the label and/or marking as a cutout, and the latter is imaged onto the surface of the spectacle lens.

The method has the disadvantages that it is very expensive, and that in the course of mask inscription most of the laser energy is reflected unused at the mask or converted into heat. Moreover, the label and/or marking engraved with the aid of this method is visible only in reflected light.

SUMMARY OF THE INVENTION

It is an objection of the invention to produce an optical lens or glass whose label and/or marking is immediately visible, in order to permit the brand product, which corresponds to the quality requirements, to be identified under all lighting conditions.

Other objects, advantages and novel features of the present invention will become apparent from the following detailed description of the invention when considered in conjunction with the accompanying drawings.

DETAILED DESCRIPTION OF THE DRAWING

The lens or glass achieves the foregoing object according to the invention by having a label and/or marking on the front surface and/or rear surface and distinguishes by a label and/or marking that comprises a multiplicity of elements of which each causes a spectral dispersion of both the incident and the reflected light.

In order to produce the above-named label and/or marking in an immediately visible manner without it changing the optical properties of the glass in the region of the glass surface where it is applied, it is produced to be transparent by providing that the elements of which the label and/or marking are composed are regular bodies such as, for example, prisms which consist of transparent faces as shown in the figures. These bodies cause, from various angles of view, a spectral dispersion of the light, and thus lend the label and/or marking an immediately visible and unmistakable appearance.

Figure 1:
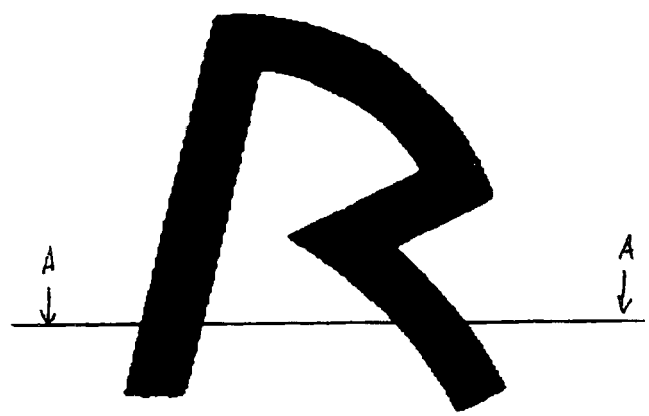
FIG. 1 is a plan view of the label that can be attached to or be a part of the front and/or rear surface of an optical lens according to the method of the present invention.
Figure 2:
FIG. 2 is a cross-sectional view along lens A—A of FIG. 1.

The advantage that the label and/or marking shown in FIGS. 1 and 2 is visible from the outside without causing a change in the properties of the glass, something which is very important, for example, both for watch glasses and for spectacle lenses, is ensured when the region to which the label and/or marking is applied does not exceed an area of 2.00 $cm^2$.

In the case of a method according to the invention for producing this lens or glass, the casting of an in particular polymerizable material into a mold is provide, with the mold having at least one casting surface for producing the corresponding optical surface of the lens. The method is distinguished in that the casting surfaces has recesses and elevations that are complementary to the elements of which the marking and/or label is composed.

The great advantages of this method reside in the use of a quick procedure which avoids the careful and complicated engraving of the glass surface. The use of a mold also results in the advantageous possibility of achieving a better reproducibility in the production of the labels and/or markings.

The recesses and elevations of the casting surface are normally milled in or introduced by engraving, and this has the advantage of permitting the mold to be processed quickly, and yet finely. The small number of items that require a mold to be engraved or milled further indicate a method that is inexpensive.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An optical lens or glass having at least one of a label and a marking on at least one of a front surface thereof and a rear surface thereof, wherein the at least one of the label and the marking comprises elements configured to cause a spectral dispersion of incident and reflected light, and the elements being regular bodies that comprise at least two faces and that protrude from at least one of the front surface and the rear surface.

2. The lens as claimed in claim 1, wherein the at least one of the label and marking is transparent.

3. The lens as claimed in claim 1, wherein the elements are prisms.

4. The lens as claimed in claim 3, wherein the at least one of the label and marking is transparent.

5. The lens as claimed in claim 1, wherein the faces of the regular bodies are transparent.

6. The lens as claimed in claim 4, wherein the at least one of the label and marking is transparent.

7. The lens as claimed in claim 6, wherein the elements are prisms.

8. The lens as claimed in claim 1, wherein a region to which at least one of the label and the marking is applied defines an area not in excess of 2.00 $cm^2$.

9. The lens as claimed in claim 8, wherein the at least one of the label and marking is transparent.

10. The lens as claimed in claim 9, wherein the elements are prisms.

11. The lens as claimed in claim 10, wherein the faces of the regular bodies are transparent.

12. The lens as claimed in claim 1, wherein the lens is a spectacle lens.

13. A method of producing a lens, including spectacle lenses and watch glasses, comprising: casting polymerizable material into a mold that has at least one casting surface for producing a corresponding optical surface of the lens, wherein the casting surface has at least one of recesses and elevations that are complementary to elements comprising at least one of the marking and label such that the elements protrude from at least one of a front surface and a rear surface of the lens.

14. The method as claimed in claim 13, further comprising milling the complementary recesses are one of milled into the casting surface and engraved.

* * * * *